United States Patent
Yamamoto

(10) Patent No.: US 10,866,772 B2
(45) Date of Patent: Dec. 15, 2020

(54) TEST CHART AND IMAGE FORMING APPARATUS

(71) Applicant: KYOCERA Document Solutions Inc., Osaka (JP)

(72) Inventor: Takenori Yamamoto, Osaka (JP)

(73) Assignee: Kyocera Document Solutions, Inc. (JP)

( * ) Notice: Subject to any disclaimer, the term of this patent is extended or adjusted under 35 U.S.C. 154(b) by 0 days.

(21) Appl. No.: 16/694,457

(22) Filed: Nov. 25, 2019

(65) Prior Publication Data

US 2020/0167108 A1 May 28, 2020

(30) Foreign Application Priority Data

Nov. 27, 2018 (JP) .................. 2018-221746

(51) Int. Cl.
*G06F 3/12* (2006.01)
*B65H 7/06* (2006.01)

(52) U.S. Cl.
CPC ............. *G06F 3/1256* (2013.01); *B65H 7/06* (2013.01); *G06F 3/121* (2013.01); *G06F 3/1208* (2013.01)

(58) Field of Classification Search
CPC .. G06F 3/1256; G06F 3/1208; H04N 1/00045
See application file for complete search history.

(56) References Cited

U.S. PATENT DOCUMENTS

2010/0103447 A1* 4/2010 Gurr, Jr. ................. B41J 29/393
358/1.15

FOREIGN PATENT DOCUMENTS

JP     2010-212745     9/2008

* cited by examiner

Primary Examiner — Eric A. Rust

(57) ABSTRACT

A test chart is obtained by printing a test chart image using an image forming apparatus for skew measurement of the image forming apparatus. The test chart includes a first scale image that includes a scale along a secondary scanning direction and a second scale image that includes a scale along the secondary scanning direction. The first and second scale images are arranged along a primary scanning direction. When a top-end part of the test chart is folded back, a top end of the test chart indicates different values from each other on the first and second scale images in accordance with a skew angle.

2 Claims, 8 Drawing Sheets

FIG. 8
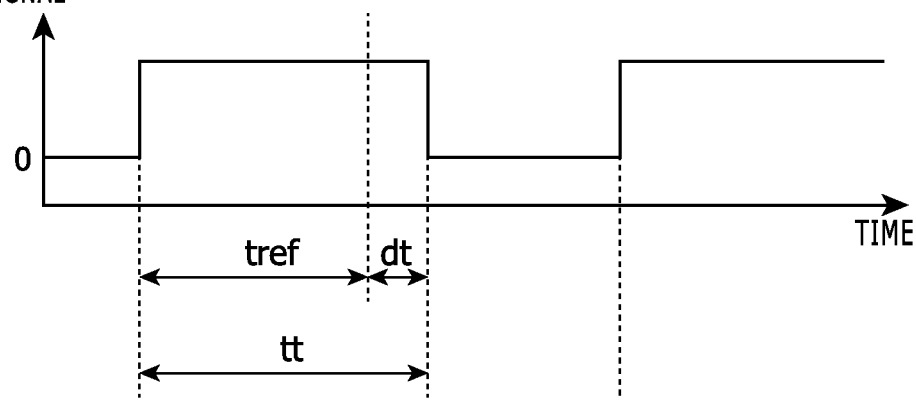
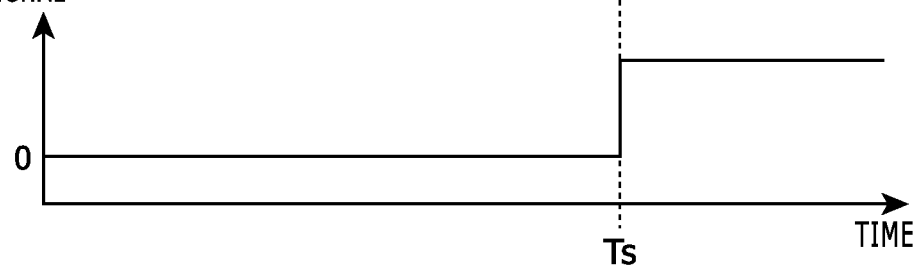

TEST CHART AND IMAGE FORMING APPARATUS

CROSS-REFERENCE TO RELATED APPLICATIONS

This application relates to and claims priority rights from Japanese Patent Application No. 2018-221746, filed on Nov. 27, 2018, the entire disclosures of which are hereby incorporated by reference herein.

BACKGROUND

1. Field of the Present Disclosure

The present disclosure relates to a test chart and an image forming apparatus.

2. Description of the Related Art

An image forming apparatus prints register marks on a front face and a back face, detects positions of the register marks using a line sensor, determines a difference between the register marks positions on the front and back faces, and adjusts a printing position of an image in accordance with the determined difference so as to agree a position of an image on a front face and a position of an image on a back face with each other.

However, such an image forming apparatus requires a scanner or a sensor to scan a test chart printed for such adjustment of the image forming apparatus, and it causes a high cost of the image forming apparatus.

SUMMARY

A test chart according to an aspect of the present disclosure is a test chart obtained by printing a test chart image using an image forming apparatus for skew measurement of the image forming apparatus. The test chart includes a first scale image that includes a scale along a secondary scanning direction and a second scale image that includes a scale along the secondary scanning direction. The first and second scale images are arranged along a primary scanning direction. When a top-end part of the test chart is folded back, a top end of the test chart indicates different values from each other on the first and second scale images in accordance with a skew angle.

An image forming apparatus according to an aspect of the present disclosure includes an image outputting unit, a control unit, an input device, and a correction processing unit. The image outputting unit is configured to print an image in a predetermined printing manner. The control unit is configured to control the image outputting unit to print the aforementioned test chart image based on test chart image data on a print sheet and thereby generate a test chart. The input device is configured to receive manual input of values that a top end of the test chart indicates on scales in the first and second scale images when the top-end part of the test chart is folded back. The correction processing unit is configured to determines a skew angle on the basis of the values received by the input device, and generate correction data for the image outputting unit in order to reduce the skew angle.

These and other objects, features and advantages of the present disclosure will become more apparent upon reading of the following detailed description along with the accompanied drawings.

BRIEF DESCRIPTION OF THE DRAWINGS

FIG. 8 shows a timing chart that indicates an example of a transportation roller driving signal to cause the sheet transportation unit to reduce the skew.

DETAILED DESCRIPTION

Hereinafter, an embodiment according to an aspect of the present disclosure will be explained with reference to drawings.

Figure 1:
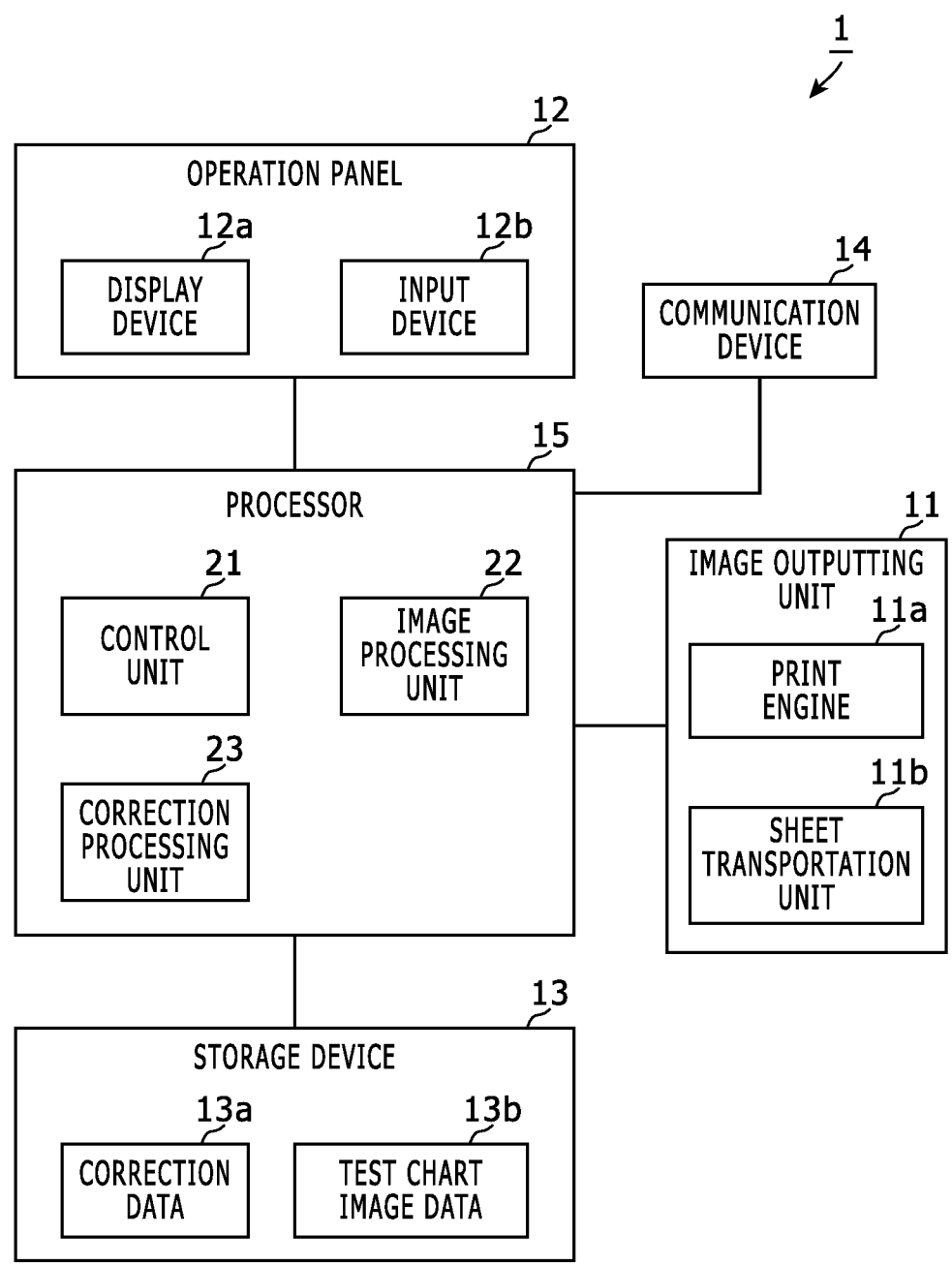
FIG. 1 shows a block diagram that indicates a configuration of an image forming apparatus according to an embodiment of the present disclosure.

FIG. 1 shows a block diagram that indicates a configuration of an image forming apparatus according to an embodiment of the present disclosure. The image forming apparatus shown in FIG. 1 is a printer, a multi function peripheral or the like, and includes an image outputting unit 11, an operation panel 12, a storage device 13, a communication device 14, and a processor 15.

The image outputting unit 11 print an image to be printed on a print sheet (i.e. print paper sheet or the like) in a predetermined printing manner (i.e. in an electrophotographic manner, an inkjet manner or the like).

The image outputting unit 11 includes a print engine 11a that physically prints an image on a print sheet in a predetermined printing manner, and a sheet transportation unit 11b that transports the print sheet to the print engine 11a.

The operation panel 12 is arranged on a surface of a housing of this image forming apparatus 1, and includes a display device 12a and an input device 12b. The display device 12a includes a display panel that displays an input screen, an operation screen and/or the like, an indicator, and/or the like. The input device 12b includes a touch panel to form a soft key, a hard key, and/or the like.

The storage device 13 is a non volatile storage device such as a flash memory or a hard disk drive, and stores sorts of data and programs.

In the storage device 13, correction data 13a and test chart image data 13b are stored. The correction data 13a is data that indicates an adjustment value to be set to the image outputting unit 11 such that the adjustment value corresponds to a condition of the image outputting unit 11. The test chart image data 13b is image data (e.g. raster image data) of a test chart image mentioned below. Here, the adjustment value may be a driving time length of a transportation roller previous to a registration roller in a transportation path in order to restrain skew of a print sheet.

The communication device 14 is a peripheral device interface, a network interface or the like, and performs data communication with a host apparatus.

The processor 15 includes an ASIC (Application Specific Integrated Circuit) that performs a specific process as a hardware process, and a computer that performs a process described in a program as a software process, and acts as processing units using the ASIC and/or computer. The program to be executed by the processor 15 is stored in the storage device 13, and the computer in the processor 15 includes a CPU (Central Processing Unit), a ROM (Read Only Memory), a RAM (Random Access Memory) and the like, and loads a program from the ROM or the storage device 13 and executes the program using the CPU.

The processor 15 acts as a control unit 21, an image processing unit 22, and a correction processing unit 23.

The control unit 21 is a processing unit that controls the image outputting unit 11, the image processing unit 22 and/or the like to perform a job in accordance with a print request received by the communication device 14 from the host apparatus, a user operation to the operation panel 12, or the like.

In particular, the control unit 21 generates a test chart using the image outputting unit 11 and the like when receiving a user operation or the like for test chart generation. The control unit 21 controls the image outputting unit 11 to print a test chart image based on test chart image data 13b on a print sheet and thereby generates a test chart.

The image processing unit 22 generates raster image data from a print request and performs a predetermined image process (color conversion, halftoning and the like), and thereby generates print image data to control the image outputting unit 11 so as to print an image to be printed.

The next part explains a test chart image based on the test chart image data 13b.

Figure 2:
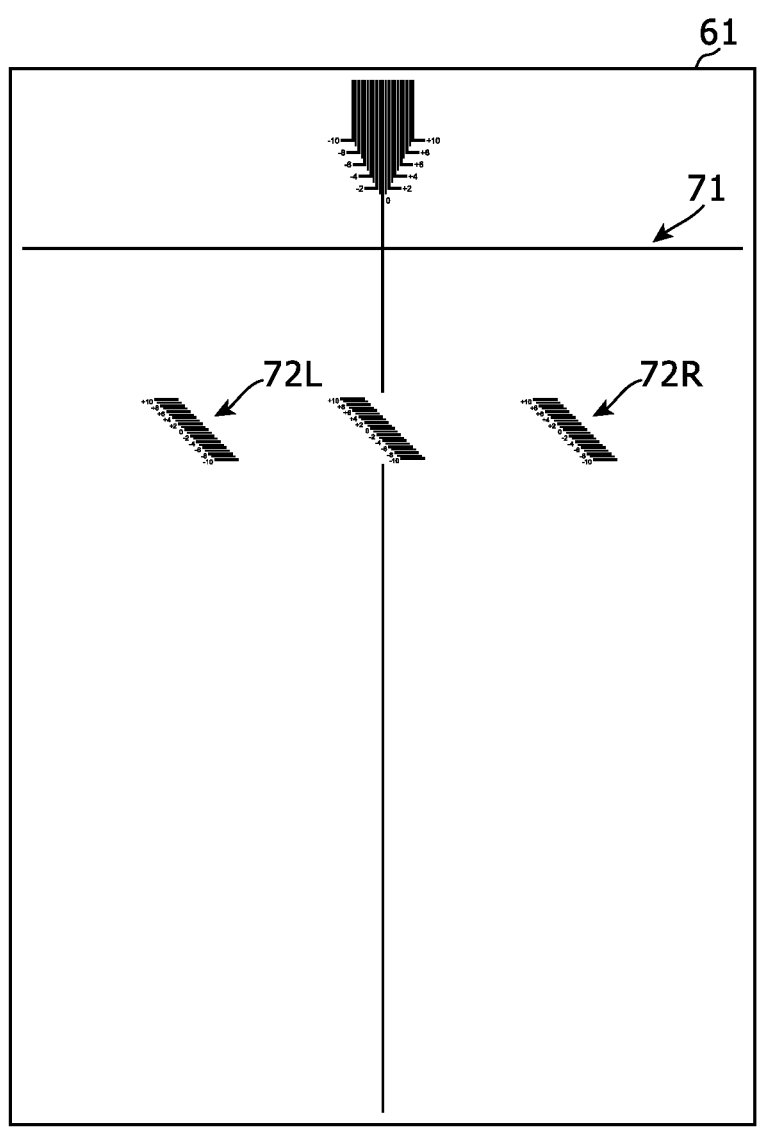
FIG. 2 shows a diagram that indicates an example of a test chart image.
Figure 3:
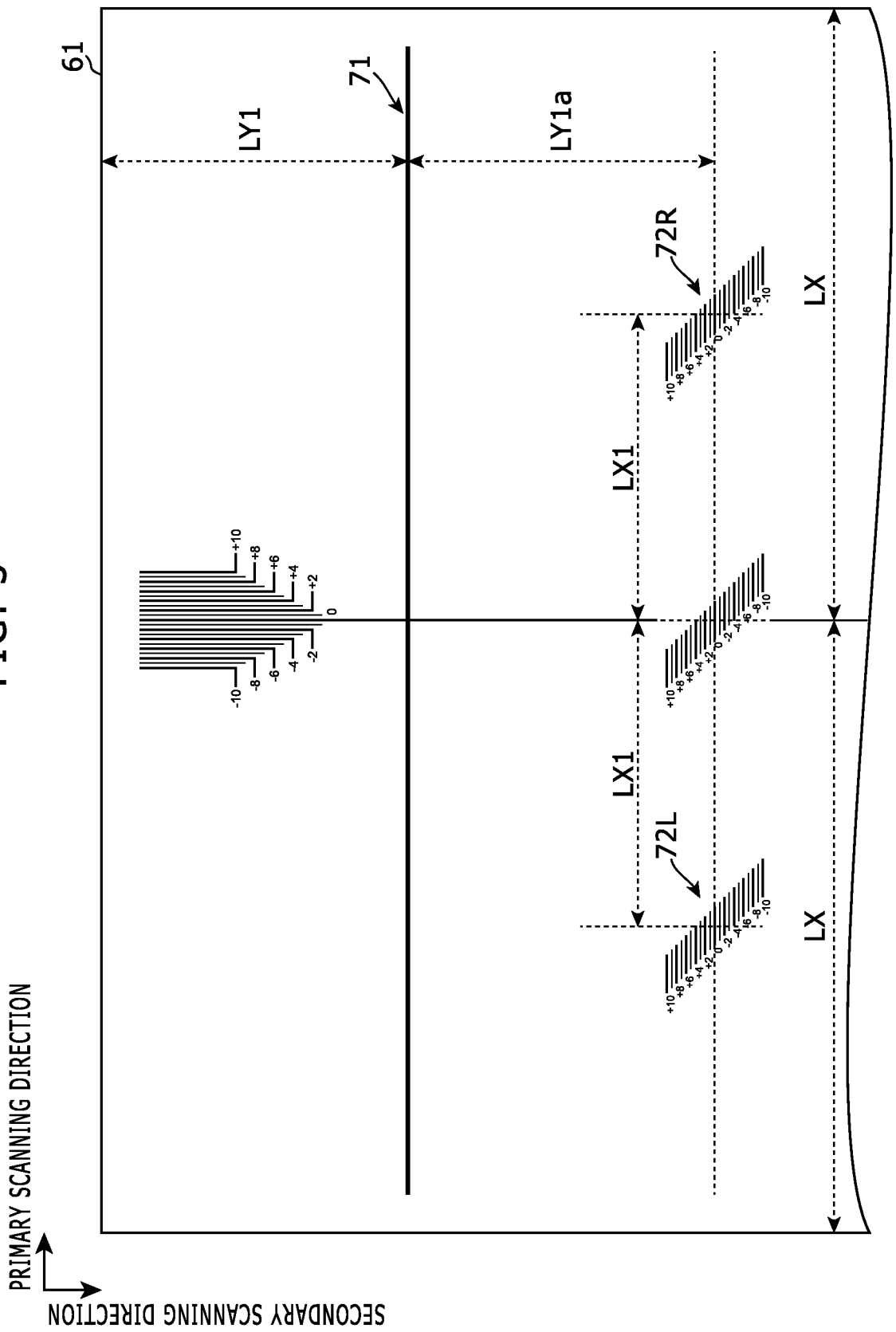
FIG. 3 shows a diagram that indicates details of the test chart image shown in FIG. 2.

FIG. 2 shows a diagram that indicates an example of a test chart image. FIG. 3 shows a diagram that indicates details of the test chart image shown in FIG. 2.

A test chart image 61 shown in FIGS. 2 and 3 includes a folding back position image 71 that has a straight-line shape along a primary scanning direction, a scale image 72L that includes a scale along a secondary scanning direction, and a scale image 72R that includes a scale along the secondary scanning direction. The scale images 72L and 72R are arranged along the primary scanning direction. Further, here, the scale images 72L and 72R are arranged at positions apart from a center in the primary scanning direction of the test chart image 61 by a predetermined distance LX1, respectively. Furthermore, the scale images 72L and 72R themselves are identical to each other.

Identical to each other are (a) a distance LY1 from a top end of the test chart image 61 to the folding back position image 71 and (b) a distance LY1a from the folding back position image 71 to a zero-value position in the scales in the scale images 72L and 72R. However, if a margin of a width dY is set at a top-end part when the test chart 61 is printed, the LY1a is equal to a sum of the distance LY1 and the width dY of the margin.

An interval between tickmark positions of numerical values in the aforementioned scales is set as a predetermined number of pixels, such that the number of pixels corresponding to a value read on the scale is enabled to be determined.

The next part explains a test chart generated by the image outputting unit 11.

Figure 4:
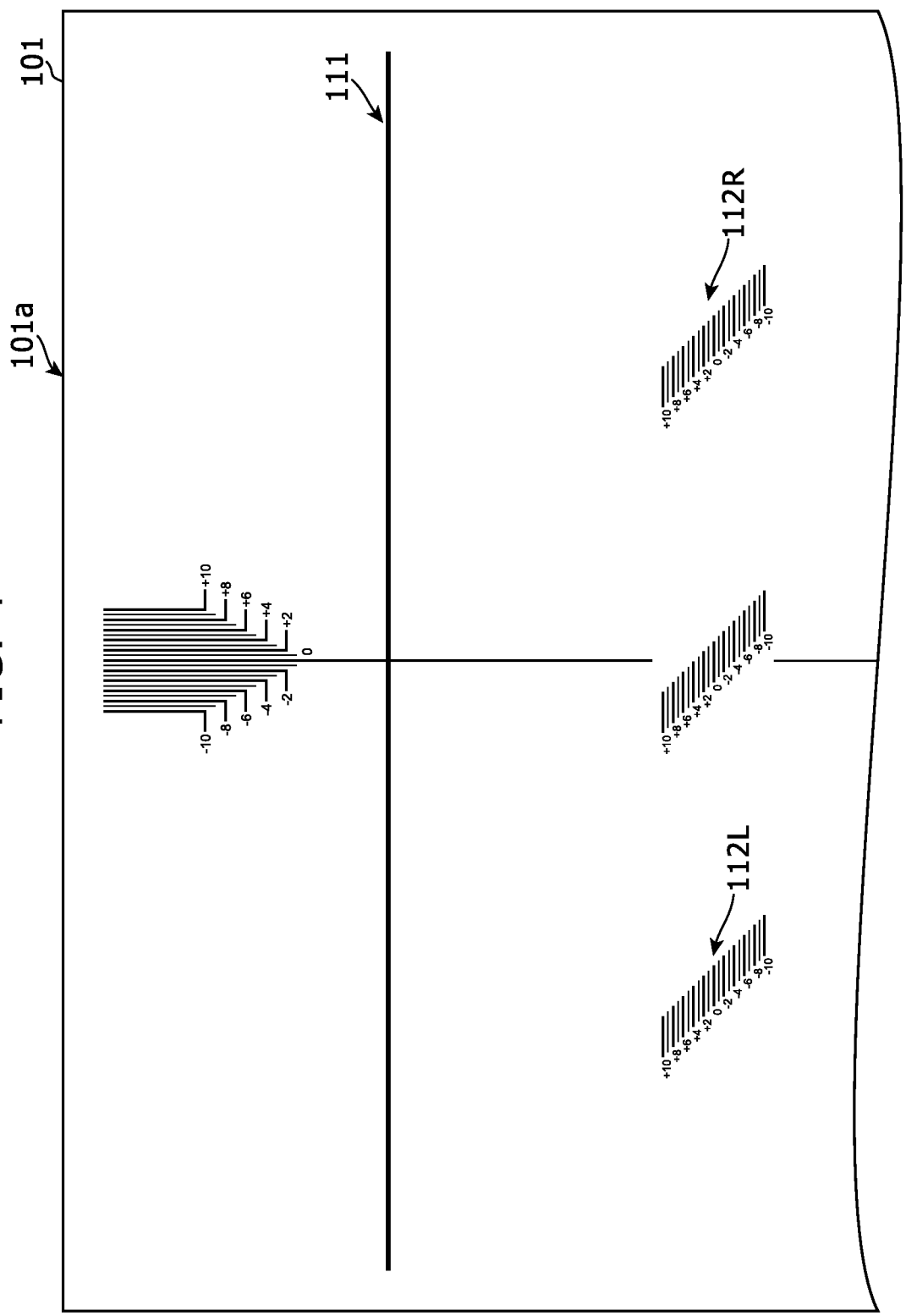
FIG. 4 shows a diagram that indicates an example of a test chart generated by the image forming apparatus shown in FIG. 1.

FIG. 4 shows a diagram that indicates an example of a test chart generated by the image forming apparatus 1 shown in FIG. 1. On a test chart 101 shown in FIG. 4, the aforementioned test chart image 61 has been printed in accordance with the current correction data 13a.

In the test chart 101, skew (i.e. an error angle between a printed image and a print sheet) may occur due to aging of the image forming apparatus 1, change of its environmental condition and/or the like. Therefore, on the test chart 101, a folding back position image 111, a scale image 112L and a scale image 112L have been printed; and (a) the folding back position image 111 has a straight line shape and is rotated by a skew angle from the primary scanning direction, (b) the scale image 112L includes a scale rotated by a skew angle from the secondary scanning direction, and (c) the scale image 112R includes a scale rotated by a skew angle from the secondary scanning direction.

Figure 5:
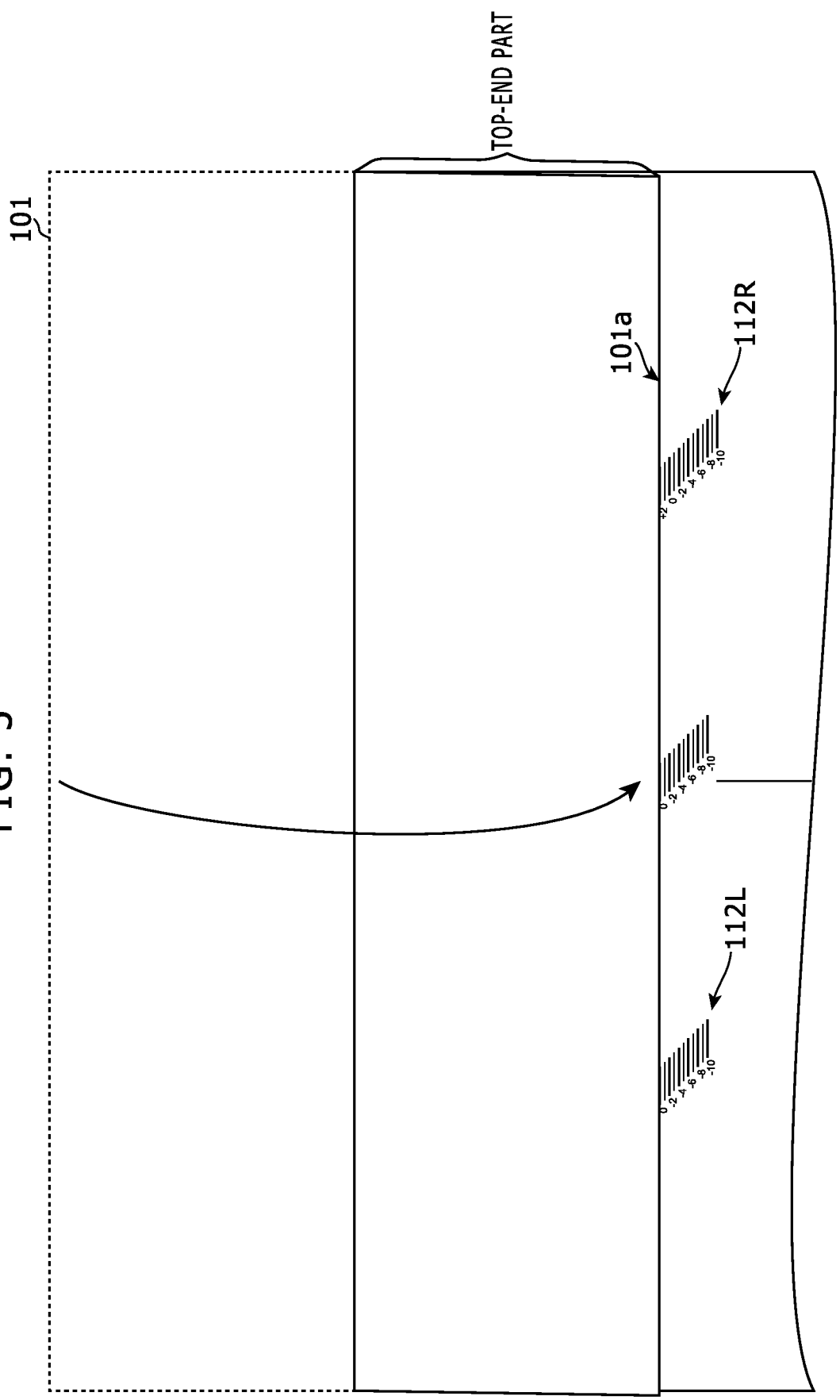
FIG. 5 shows a diagram that explains skew measurement of a print image with visual checking in a secondary scanning direction of the test chart 101 shown in FIG. 4.
Figure 6:
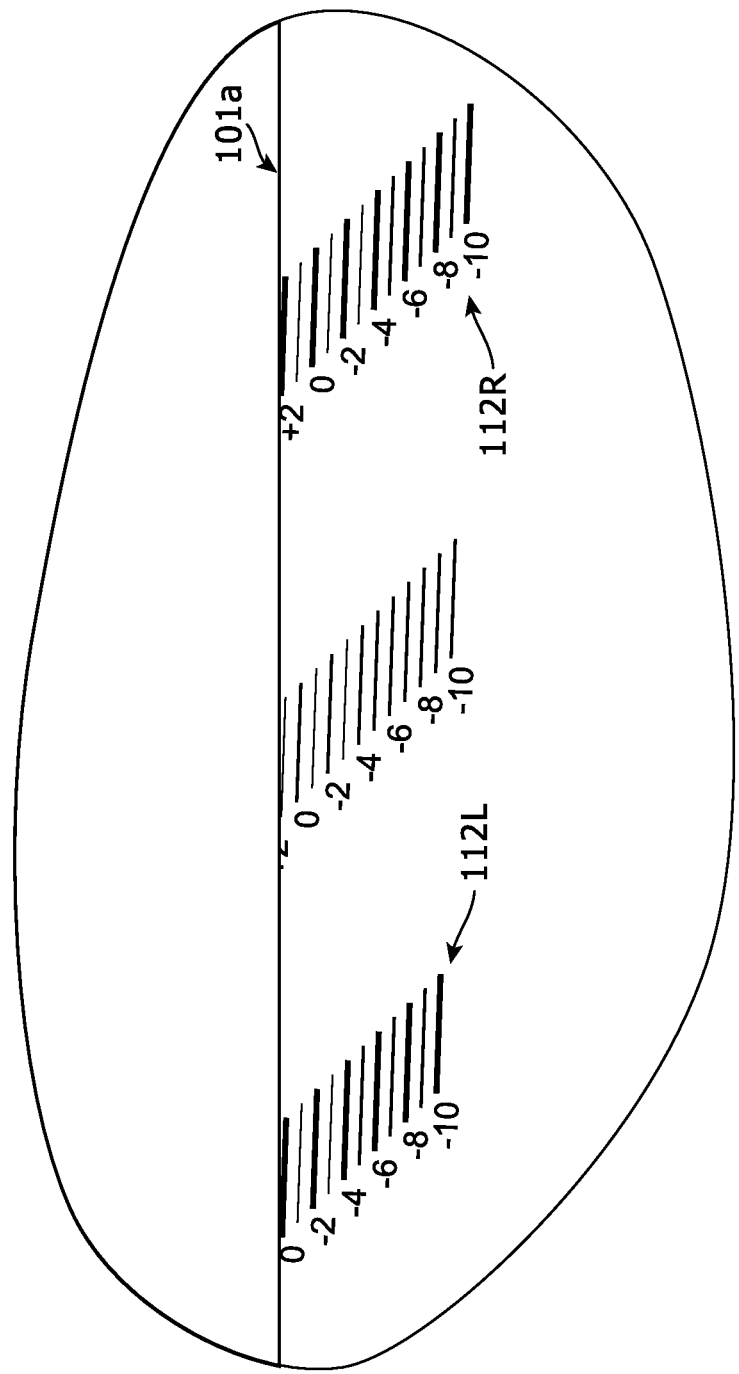
FIG. 6 shows a diagram that explains a measurement value read with a scale in the skew measurement shown in FIG. 5.

FIG. 5 shows a diagram that explains skew measurement of a print image with visual checking in a secondary scanning direction of the test chart 101 shown in FIG. 4. FIG. 6 shows a diagram that explains a measurement value read with a scale in the skew measurement shown in FIG. 5.

As shown in FIG. 5, when the top-end part of the test chart 101 is folded back by 180 degrees so as to form a crease at the folding back position image 111 or near along the primary scanning direction, as shown in FIG. 6, the top end 101a of the test chart 101 indicates different values from each other on the scales in the scale images 112L and 112R such that the different value corresponds to the skew angle.

If the skew angle is zero, namely there is no skew, then the top end 101a of the test chart 101 indicates identical values to each other on the scales in the scale images 112L and 112R.

In the example shown in FIG. 6, the measurement value "0" is visually read as a measurement value of the scale in the scale image 112L, and the measurement value "+2" is visually read as a measurement value of the scale in the scale image 112R.

In this manner, obtained are two measurement values corresponding to the skew angle (i.e. oblique motion angle of the print sheet).

It should be noted that (a) an interval between the scale images 112L and 112R (=2*LX1) and (b) the scales in the scale images 112L and 112R are set in accordance with a range of the skew angle to be detected.

Returning to FIG. 1, the correction processing unit 23 determines the skew angle that currently arises in the image forming apparatus 1, on the basis of the two measurement values corresponding to the skew angle, and generates the correction data 13a for the image outputting unit 11 in order to reduce the skew angle.

The two measurement values that indicate the skew are received by the input device 12b. The input device 12b receives manual input of values that a top end of the test chart indicates on scales in the scale images 112L and 112R when a top-end part of the generated test chart is folded back (i.e. manual input of the measurement values of the skew in a current condition of the image forming apparatus 1).

Figure 7:
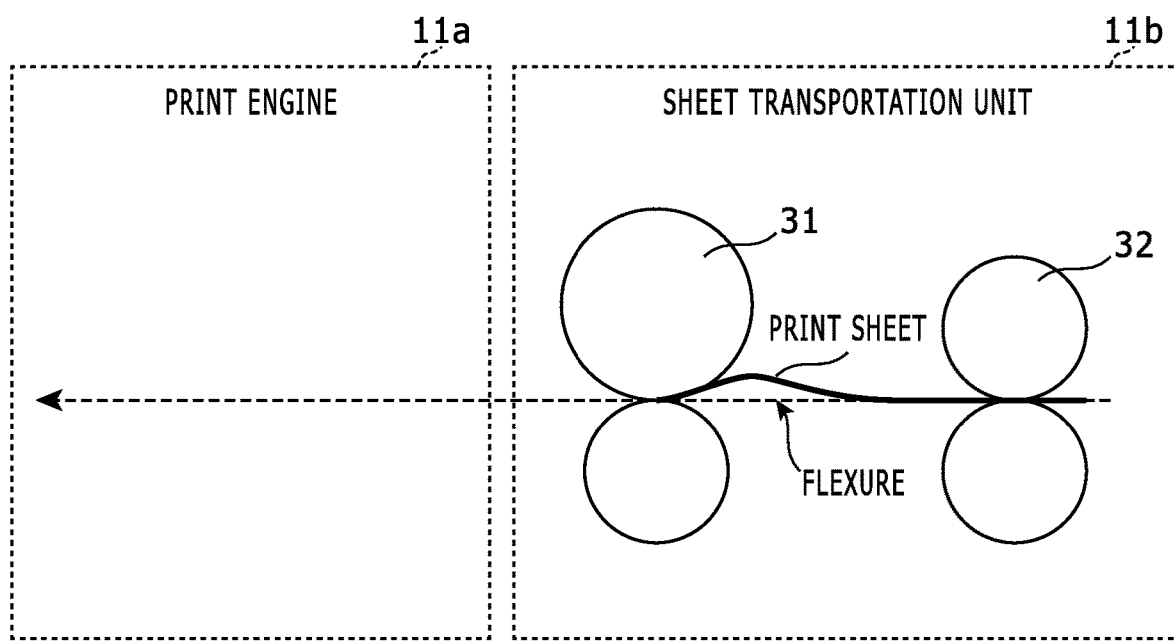
FIG. 7 shows a diagram that explains a behavior to reduce skew using a sheet transportation unit shown in FIG. 1.

The next part explains a skew restraint behavior in the image forming apparatus 1 in this embodiment. FIG. 7 shows a diagram that explains a behavior to reduce skew using the sheet transportation unit 11b shown in FIG. 1. FIG. 8 shows a timing chart that indicates an example of a transportation roller driving signal to cause the sheet transportation unit 11b to reduce the skew.

As shown in FIG. 7, the sheet transportation unit 11b includes a registration roller 31, and a transportation roller 32 that transports a print sheet to the registration roller 31. The registration roller 31 is a roller to retain a print sheet and output the print sheet to the print engine 11a at a proper timing Ts.

The registration roller 31 and the transportation roller 32 are driven by a motor (not shown), and driving time of the transportation roller is specified by a transportation roller driving signal applied to the motor.

On the basis of (a) a linear velocity of a print sheet by the transportation roller 32 and (b) a distance between the registration roller 31 and the transportation roller 32, a time length required for the top end of the print sheet to move from the transportation roller 32 to the registration roller 31 is acquired as a reference time length tref. If the transportation roller 32 is driven for a time length more than the reference time length tref, then flexure occurs of the print sheet as shown in FIG. 7. Such small flexure of the print sheet reduces the skew of the print sheet when transporting it to the print engine 11.

Therefore, the correction data 13a includes a driving time length tt of the transportation roller 32 for creating flexure corresponding to the skew angle with the registration roller 31. In this embodiment, the larger the skew angle of the print sheet is, the larger the flexure gets. In other words, for a larger skew angle of a print sheet, the driving time length tt of the transportation roller 32 is set so as to get a larger difference between the driving time length tt and the reference time length tref. The control unit 21 sets the driving time length tt of the transportation roller 32 to the image outputting unit 11 in accordance with the correction data 13a.

The following part explains a behavior of the image forming apparatus 1 in this embodiment.

In accordance with a user operation or the like, the control unit 21 (a) performs a predetermined image process for the test chart image data 13b using the image processing unit 22, and (b) performs printing of a test chart image 61 based on print image data obtained by the image process and thereby generates a test chart 101, as mentioned.

A user folds back the generated test chart 101 as mentioned, and reads measurement values of two scale images 112L and 112R in the aforementioned manner, and operates the input device 12b in the operation panel 12 and thereby inputs the two measurement values. Here, for example, in accordance with a user operation, the control unit 21 displays an input screen on the display device 12a, and detects the two measurement values inputted to the input screen.

The correction processing unit 23 determines a skew angle on the basis of the two measurement values received by the input device 12b in this manner, generates correction data 13a to make the skew angle closer to zero, and updates the correction data 13a stored in the storage device 13 with the generated correction data 13a.

After the updating, printing is performed using the updated correction data 13a.

Here, assuming the measured skew angle as "THETA" and the interval (number of pixels) between the scale images 112L and 112R as "a", and the number of pixels corresponding to a difference between the two measurement values as "b", the following formula is given.

$$\text{THETA}=\arctan(b/a)$$

For example, in a case that the print sheet has a size of 12 inch width and 18 inch height, a resolution of the image is 650 dpi, and the number of pixels corresponding to an interval between values read on the scales of the scale images 112L and 112R (for example, the interval between the value "0" and the value "1") is 10, if a difference between the two measurement values is 2 as shown in FIG. 6 (i.e. 20 pixels), then a top end position of the print sheet has spatial dispersion of 32 pixels (32=12*650*tan (THETA)) in its transportation direction (i.e. an error distance of 32 pixels occurs between the top end position at a right end position of the print sheet and the top end position at a left end position of the print sheet).

Therefore, the control unit 21 determines an adjustment time length dt corresponding to a dispersion amount (e.g. 32 pixels in the aforementioned example) of the top end position of the print sheet (i.e. a value obtained by dividing the dispersion amount by a linear velocity of the print sheet), and sets the driving time length tt of the transportation roller 32 longer by the adjustment time length dt than the reference time length tref. Here, in the correction data 13a, for each of different sizes of the print sheet, the adjustment time length dt or the driving time length tt is included as an adjustment value to be specified to the image outputting unit 11.

As mentioned, in the aforementioned embodiment, in the image forming apparatus 1, the control unit 21 controls the image outputting unit 11 to print a test chart image 61 based on test chart image data 13b on a print sheet and thereby generates a test chart 101, the input device 12b receives manual input of values that a top end of the test chart 101 indicates on scales in scale images 112L and 112R when a top-end part of the test chart 101 is folded back, and the correction processing unit 23 determines a skew angle on the basis of the values received by the input device 12b, and generates correction data 13a for the image outputting unit 11 in order to reduce the skew angle.

This test chart 101 is a printed matter obtained by printing the test chart image 61 using the image forming apparatus 1 for skew measurement of this image forming apparatus 1; and the test chart image 61 includes the scale image 112L that includes a scale along a secondary scanning direction and the scale image 112R that includes a scale along the secondary scanning direction, and the scale images 112L and 112R are arranged along a primary scanning direction. Further, the test chart 101 is formed such that when a top-end part of the test chart 101 is folded back, a top end of the test chart 101 indicates different values from each other on the scale images 112L and 112R in accordance with a skew angle.

Consequently, without requiring a scanner or a sensor to scan the test chart 101 printed out for adjusting the image forming apparatus 1, the test chart 101 enables to adjust the image forming apparatus 1 that printed out this test chart 101.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

For example, in the aforementioned embodiment, a default adjustment value may be applied instead of the current correction data 13a when printing the test chart image 61 (i.e. when generating the test chart 101); and in such a case, the correction data 13a stored in the storage device 13 is updated with new correction data 13a obtained on the basis of the generated test chart 101. Contrarily, if the current correction data 13a is applied when printing the test chart image 61 (i.e. when generating the test chart 101), then new correction data 13a obtained on the basis of the generated test chart 101 is considered as a correction amount, new correction data 13a is derived on the basis of the current correction data 13a in the storage device 13 and this correction amount (e.g. as a sum of the both), and the correction data 13*a* stored in the storage device 13 is updated with the new correction data 13*a*.

What is claimed is:

1. An image forming apparatus, comprising
an image outputting unit configured to print an image in a predetermined printing manner;
a control unit configured to control the image outputting unit to print a test chart image based on test chart image data on a print sheet and thereby generate a test chart;
an input device configured to receive manual input of values that a top end of the test chart indicates on scales in first and second scale images when a top-end part of the test chart is folded back; and
a correction processing unit configured to determine a skew angle on the basis of the values received by the input device, and generate correction data for the image outputting unit in order to reduce the skew angle;
wherein the test chart image is a test chart image for skew measurement of the image forming apparatus;
the test chart image comprises a first scale image that includes a scale along a secondary scanning direction and a second scale image that includes a scale along the secondary scanning direction;
the first and second scale images are arranged along a primary scanning direction; and
when a top-end part is folded back, a top end of the test chart indicates different values from each other on the first and second scale images in accordance with a skew angle.

2. The image forming apparatus according to claim 1, further comprising:
a print engine configured to print an image on the print sheet; and
a sheet transportation unit configured to transport the print sheet to the print engine;
wherein the sheet transportation unit comprises a registration roller, and a transportation roller that transports the print sheet to the registration roller; and
the correction data includes a driving time length of the transportation roller, the driving time length causing flexure corresponding to the skew angle to occur of the print sheet with the registration roller.

* * * * *